Oct. 3, 1967  J. L. POESL  3,344,535
PORTABLE ELECTRICAL TEST UNITS
Filed June 30, 1965  7 Sheets-Sheet 1

Oct. 3, 1967  J. L. POESL  3,344,535
PORTABLE ELECTRICAL TEST UNITS

Filed June 30, 1965  7 Sheets-Sheet 2

Oct. 3, 1967   J. L. POESL   3,344,535
PORTABLE ELECTRICAL TEST UNITS
Filed June 30, 1965   7 Sheets-Sheet 3

Oct. 3, 1967 J. L. POESL 3,344,535
PORTABLE ELECTRICAL TEST UNITS
Filed June 30, 1965 7 Sheets-Sheet 4

United States Patent Office 3,344,535
Patented Oct. 3, 1967

3,344,535
PORTABLE ELECTRICAL TEST UNITS
John L. Poesl, Pierrefonds, Quebec, Canada, assignor to Unelco Limited—Unelco Limitee
Filed June 30, 1965, Ser. No. 468,359
Claims priority, application Canada, July 9, 1964, 906,831; Mar. 9, 1965, 925,159
31 Claims. (Cl. 35—19)

This invention relates to electrical test apparatus for use in laboratories of training institutions and particularly electrical devices having a stator and rotor such as motors, generators, or combined motor generator units mounted in a manner whereby the electrical devices are portable with the rotors of two adjacent portable units readily detachably securable together to rotate in unison.

Known test units consist of individual motors, generators, or combined motor generator units permanently connected and secured to a rigid base which is fixed to a suitable foundation.

Further known devices consist of a motor and generator or a pair of motor-generator units permanently connected and secured to a table, the latter of which is transportable by means of suitable casters secured to the legs.

Each of the above known units further includes specific cricuitry and terminals to permit variously connecting the circuits of the motor and generator whereby the student may effect various tests when the rotors of the motor and generator are connected to rotate in unison.

It is obvious that the foregoing known permanently mounted types of apparatus or portable permanently connected units do not provide versatility necessary for full use of the equipment by the students. Furthermore, the time allotment for each class is usually such that little or no time can be wasted in setting up equipment if anything is to be gained in performing tests with the equipment when set up.

Generators or motors or combined motor-generator units having a stator and rotor will be referred to hereinafter generally as electrical devices and such electrical devices mounted upon a transportable carriage will hereinafter be referred to as a test unit.

It is an object of the present invention to provide improvements to test units so that they are readily portable and versatile such that the student may readily connect or disconnect a pair of units for effecting various tests on the electrical devices.

In one aspect of the invention there is provided a carriage for a test unit which is readily detachably securable to an adjacent unit.

In a still further aspect of the invention, there is provided a portable carriage having an electrical device mounted thereon which includes a rotor, a second carriage having a further electrical device mounted thereon which includes rotor, means whereby the carriages may be detachably interconnected side by side and further means whereby the rotors of the electrical devices of the two adjacent carriages joined together are readily detachably interconnected ot rotate in unison.

In a still further aspect of the invention, there is provided a pair of portable test units readily detachably securable together which are pleasing in appearance and safe to operate in that the rotatable parts are surrounded by structure forming portions of the respective carriages.

In a still further aspect of the present invention, there is provided a portable test unit having electrical terminals for the circuitry associated therewith readily accessible in the front face of a cabinet mounted on the carriage of the test unit and including markings on the cabinet diagrammatically to illustrate the circuit associated with each terminal.

In a still further aspect of the present invention, there is provided portable test units wherein conductive terminals are mounted upon and securely fastened to an insulating panel which forms a portion of a casing enclosing circuitry associated with an electrical device mounted on the carriage of the test unit.

The invention is illustrated by way of example in the accompanying drawings wherein.

Basically, the inventive concept resides in providing portable electrical test units and in one aspect there is provided portable test units wherein the rotors of electrical devices, mounted on carriages of respective ones of a pair of such test units, may be readily detachably connected in driving and driven relationship. According to one aspect of the invention, there is provided a carriage having means associated therewith for detachably interconnecting a pair of adjacent carriages in side-by-side relationship. In a more restricted aspect of the invention, there is provided a carriage of the foregoing type and a drive coupling for joining the rotors of electrical rotating devices mounted on respective ones of the side-by-side carriages. The drive coupling is for the purpose of connecting the rotor of the rotating electrical device in a drive and driven relationship.

A further feature resides in the construction of a housing enclosing the circuitry which includes an insulated front face having conductive terminals secured thereto.

Figure 1:
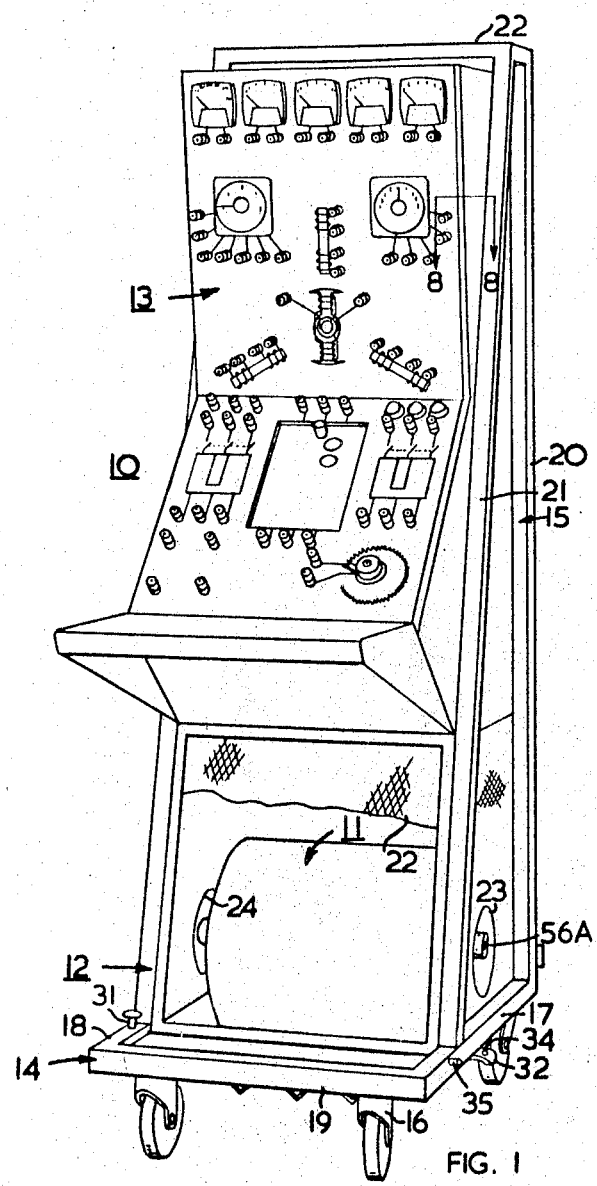
FIG. 1 is an oblique view of a single portable test unit.

Referring now in detail to the drawings, shown in FIG. 1 is a portable test unit 10 consisting of an electrical device 11 mounted upon a portable carriage 12 having a housing 13 secured thereto enclosing the electrical circuitry.

Figure 2:
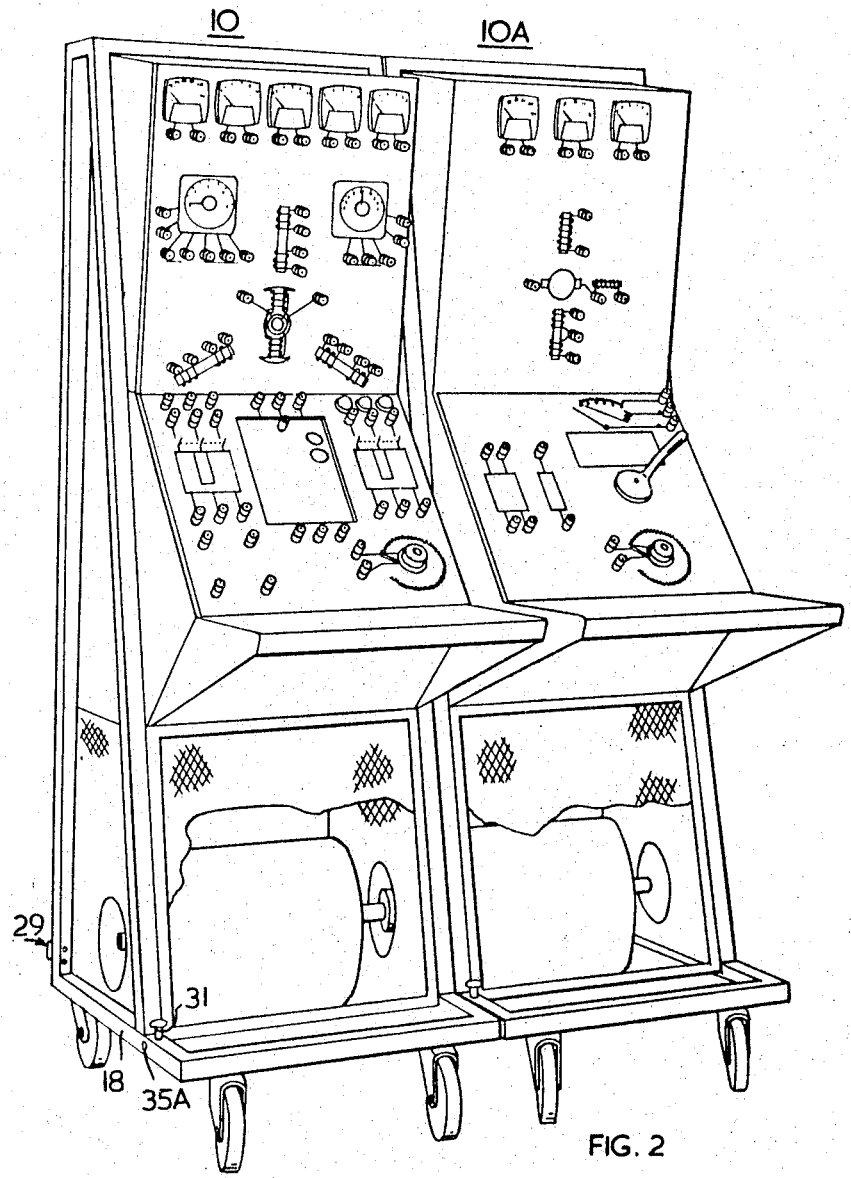
FIG. 2 is an oblique view of a pair of test units connected together side-by-side.

A pair of portable test units 10 and 10A are shown in FIG. 2 detachably interconnected in side-by-side relation with the rotors of the electrical devices in a driving and driven relationship. The two units are similar in construction, differing one from the other in the type of electrical device mounted on the carriage and the diagrammatic illustration of the circuit on the face as well as the arrangement of terminal posts associated with such circuitry.

Referring now specifically to FIG. 1, the carriage 12 consists of a base 14, an upper frame portion 15 and a plurality of casters 16. The base includes a pair of spaced, parallel opposed side members 17 and 18, a front member 19 and a rear member 28 (see FIGS. 3 and 5) welded together with the casters secured to the undersurface thereof.

The upper frame portion consists of two pairs of members 20 and 21 secured respectively to the side members 17 and 18 and project upwardly therefrom. These members converge inwardly toward one another in one plane and the members 20 and 21 on one side of the test unit are joined at the upper edge to the other pair at the other side by a rectangular frame 22.

Effectively, the upper frame 15 is a skeleton framework which provides a support for straddling and suspending therefrom the housing 13. The electrical device 11 which as previously mentioned may be an electrical motor, generator or combined motor generator, is secured to the base 14 in any convenient manner with the ends of the shaft of the rotor terminating approximately in a plane defined by respective ones of adjacent surfaces of the oppositely disposed pair of members 20 and 21, i.e., they are substantially confined within the outline area of the framework.

The electrical device is surrounded by a metal screen 22 or the like secured to the inner surface of members 20 and 21 in any convenient manner such as screws or the like. The screen enhances the appearance of the test unit and at the same time permits free circulation of air for cooling purposes. It also provides a guard around the coupling which joins the rotors of the two adjacent test units.

The electrical devices are preferably of the double ended shaft type and entry to such shafts may be made through respective apertures 23 and 24 in the screen 22.

Figure 3:
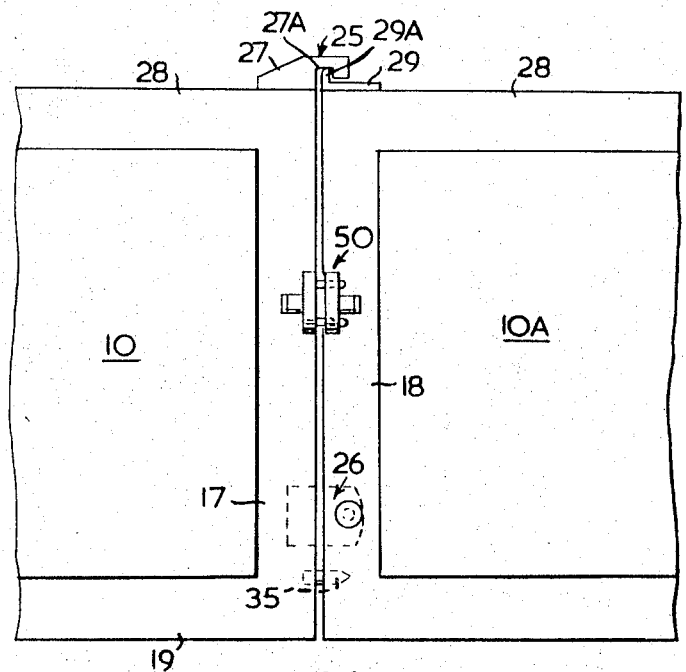
FIG. 3 is a partial sectional plan view illustrating a means of detachably joining a pair of test units in the position illustrated in FIG. 2.

In order to secure the carriage of one test unit to the carriage of an adjacent test unit, there is provided a spaced pair of interconnecting members 25 and 26 (see FIG. 3). The interconnecting member 25 consists of an element 27 secured to the rear member 28 of the base of one test unit and an element 29 secured to the rear member 28 of the base of an adjacent test unit, for example respective test units 10 and 10A, shown in FIG. 2. The element 27 includes a groove 27A disposed outboard of the end of the member 28. The element 29 is substantially L-shape having one leg thereof secured to the member 28 of the base and the other leg (identified by reference numeral 29A) projecting rearwardly therefrom. The leg 29A is adapted to project into the groove 27A of the member 27. The members 27 and 29 may be metal, plastic, or the like, and secured in any manner as, for example, welding, gluing, bolting, or any other convenient means.

Figure 4:
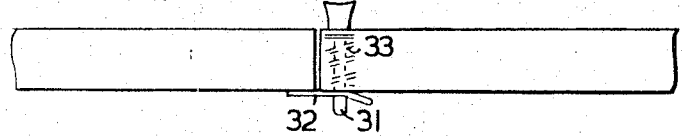
FIG. 4 is a vertical elevational view of FIG. 3.

The interconnecting member 26 is disposed forwardly of the upper frame portion 15 and is adapted to lock together the two adjacent test units. The interconnecting member consists of a pin 31 secured to member 18 of one carriage base and an apertured striker plate 32 secured to the member 17 of the carriage base of an adjacent unit. As far as the individual test units are concerned, there is a pin 31 and a plate 32 secured respectively to the base frame members 17 and 18. Each test unit further has a member 27 and 29 secured to the rear frame member adjacent respective side members 17 and 18. The pin is biased downwardly by means of a spring 33 so as to be retained in an aperture 34 of the striker plate 32. It will be noted from FIGS. 1 and 4 that the striker plate is turned downwardly at its outer extremity and the purpose of such is to facilitate lifting the pin 31 when joining together a pair of test units.

The interconnecting members 25 and 26 not only interconnect the adjacent test units but also interlock such units. In order to ensure that the test units remain interlocked in side-by-side relation and ensure alignment of the rotor of rotating electrical devices, a guide is provided consisting of a pin 35 secured to the member 17 of one carriage and projecting outwardly therefrom in a substantially horizontal direction to project into an aperture of similar size in a side face of member 18 of the carriage of the adjacent test unit.

The interconnecting member 25, upon engagement of respective elements, provides a pivot axis in bringing the adjacent units into further closer proximity to another. Effectively such pivot axis provides a guide in aligning the rotors. A further guide is also provided by the previously described pin 35 located on the member 17 and which projects into the aperture in the member 18. The cooperating elements of the connecting member 25 also function partially to lock the adjacent test units in side-by-side relation. A completion of the locking is effected by the interconnecting member 25 by virtue of the pin 31 projecting into the aperture 34 in the striker plate. It is thus seen that the members 25 and 26 not only interconnect the adjacent test units but further function to interlock the adjacent test units in their interconnected side-by-side relation.

The interconnecting members 25 and 26, which also lock the test units together, will be noted to be located adjacent the bottom end of the test unit. They could be located upwardly therefrom but, in this way, the connection is near the supporting surfaces for such test units and accordingly, any irregularities in the smoothness of the surface will result in the bases remaining substantially in abutting relationship while the upper edges to a certain extent will be permitted to be separated from one another. It is essential that the bases, where the electrical devices are located and which will be joined in a manner to be described hereinafter, remain in close abutting relationship so as not to permit the devices from becoming uncoupled during use.

A drive coupling is used to interconnect the rotor of the electrical device 11 of one test unit in driving or driven relationship with that of an adjacent test unit. It might be pointed out at this time that such drive coupling is completely enclosed or surrounded by an adjacent pair of test units. From FIG. 3, it will be seen that such drive coupling is located horizontally intermediate front and rear members 19 and 28. The drive coupling is detachable with respect to each rotor of a pair joined together in a drive and driven relationship. In view of the coupling being detachable, and because of its location it must be readily alignable and easily connected such as to connect the rotors while the test units are swung into position when being joined together.

The electrical devices 11, used for experimental purposes, also may be reversible in which case the drive coupling must be bidirectional. Also the drive coupling preferably is flexible to accommodate the aforementioned surface irregularities of a supporting floor.

Shown in the drawings are various types of drive couplings. Shown in FIGS. 5 to 8 is a drive coupling 40 consisting of a flexible shaft 41 and a pair of bell-housings 42 secured to adjacent ends of the rotor shafts of respective test units 10 and 10A.

Each bell-housing includes a body having a cavity 43, relatively large with respect to the diameter of the flexible shaft 41 and includes walls tapering inwardly from an outer edge 44 toward the center of the housing body. The cavity terminates, at the longitudinal axis of the body in a further cavity 45 non-circular in cross-section having substantially parallel side walls.

The bell-housing body includes a further cavity 46 disposed on the longitudinal axis thereof and extends inwardly from an edge 47 toward the edge 44. The cavity 46 is generally circular in cross-section although not necessarily so, and is of such diameter and depth as to receive an end portion of the rotor shaft. The bell-housing is fixed to the shaft by an Allen screw 48 threaded into a bore 49 disposed normal to the rotor shaft.

Figure 5:
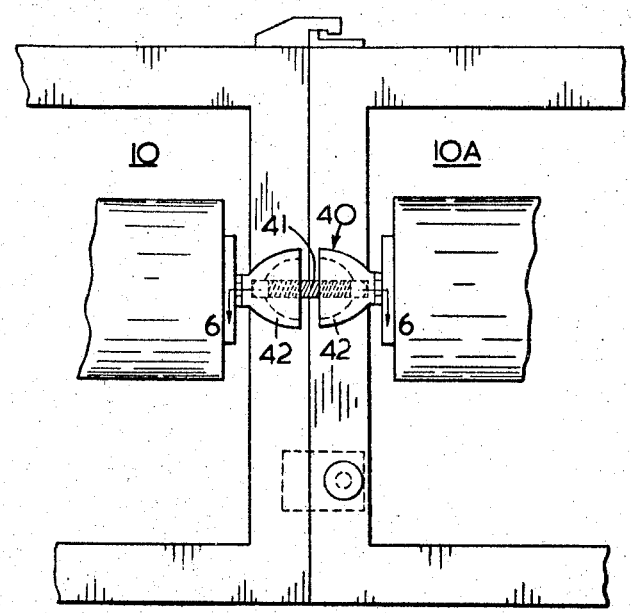
FIG. 5 is a diagrammatic plan view similar to FIG. 3, partially in section, illustrating a mechanical coupling for interconnecting the rotors of adjacent electrical rotating devices in accordance with the present invention.
Figure 6:
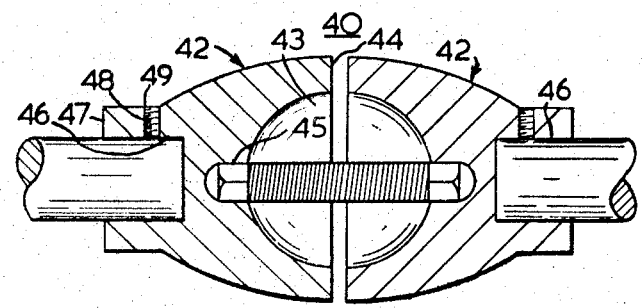
FIG. 6 is a cross-section along section 6—6 of FIG. 5.
Figure 7:
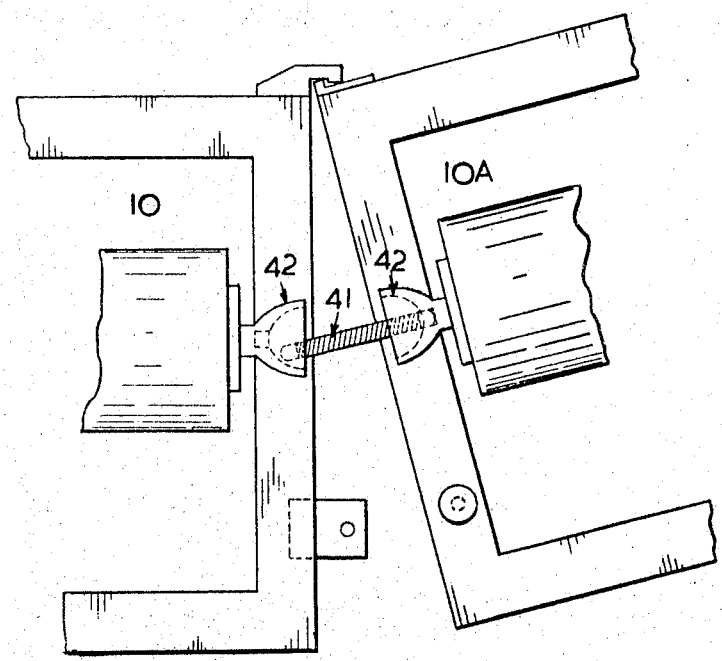
FIG. 7 is similar to FIG. 5 but illustrating connecting adjacent test units while simultaneously effecting a mechanical coupling between the rotors.

The bell-housings illustrated in FIGS. 5-7 are not true bell-shaped in cross-section, however it will be readily apparent such shape would perform the same function. A true bell shape would be desirable particularly when the walls are relatively thin as this would concentrate a major portion of the mass of the body adjacent the axis of rotation and thus facilitate balancing. In a true bell shape, the edge equivalent to 44 in FIG. 6 would form an outwardly flared flange and as will be apparent hereinafter, such flange, depending upon the diameter of the cavity, would provide a guide for the flexible drive shaft during joining together a pair of adjacent test units.

Figure 8:
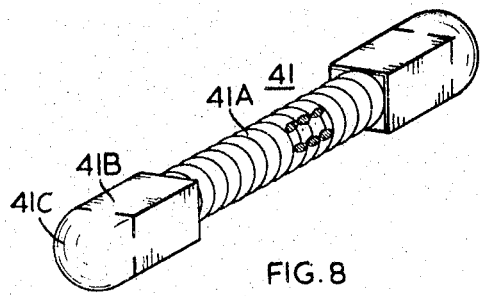
FIG. 8 is an oblique view of the mechanical coupling for interconnecting adjacent rotors as illustrated in FIGS. 5 to 7.

The flexible shaft 41 consists of a common flexible cable member 41A having opposed, flattened substantially rigid ends 41B. Each of the ends 41B may be formed integral with the shaft by flattening the same, or alternatively, as shown in FIG. 8, they may consist of separate body members secured to the shaft. Each of the body members 41B includes a spherical end portion 41C and the purpose of this will become apparent heerinafter.

The flexible cable 41A is wound from wires in an arrangement such as to drive or be driven in either of two directions.

Figure 15:
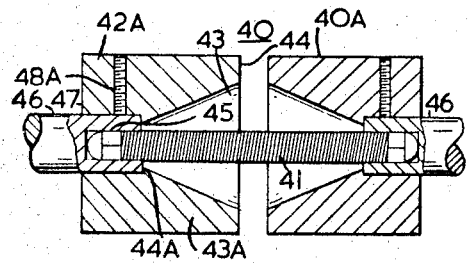

A further modified form of coupling is illustrated in FIG. 15 which consists of a pair of cylindrical members 40A and 42A interconnected by a flexible shaft 41. Each of the cylindrical members 40A and 42A has a bore extending therethrough to receive an end portion of the motor shaft. The bore in each of the members is substantially cylindrical for a portion of the depth therethrough and is conical for the remaining portion.

The conical portion is indicated generally by the reference numeral 43A and if desired, may have an inner terminal diameter less than the portion receiving the motor shaft so as to provide a shoulder 44A. This shoulder, as illustrated, limits the depth by which the shaft will project into the cylindrical member. The conical portion serves to direct the flexible shaft into the recess of the motor shaft. In this respect, the coupling differs from that described in FIG. 6. In the FIG. 6 embodiment, the non-circular end portions of the flexible shaft are received within correspondingly shaped cavities in the bell housing while in the instant embodiment they are received in correspondingly shaped recesses in the motor shaft.

The cylindrical members 40A and 42A are detachably secured to the respective motor shafts by an Allen screw 48A or other suitable means.

Figure 11:
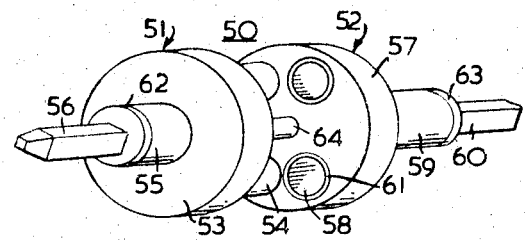
FIG. 11 is an oblique view of a further coupling for detachably connecting the rotors of the electrical rotating devices.

A further form of drive coupling is illustrated in FIGS. 3 and 11. Shown in FIG. 11 is a drive coupling 50 consisting of members 51 and 52 which are interconnected by cooperating pins and apertures located in the respective members. Member 51 includes a flange portion 53 having a plurality of pins 54 projecting from one face thereof. These pins are located at positions equidistant from the center of the flange and projecting from the opposite face is a stub shaft 55. The shaft 55 includes a first portion which may be of any configuration as, for example, circular in cross-section as shown, and a second portion 56 which is triangular, oblong, square, or otherwise non-circular in cross-section. This non-circular portion 56 is adapted to fit into a corresponding shaped recess 56A in the end of the shaft of the rotating electrical device 11. The member 52 includes a flange portion 57 having a plurality of apertures 58 extending therethrough and which are located in positions corresponding to the pins 54 in the other member. These pins project from the flange a sufficient distance such that the pins may project into the apertures. Projecting from the other face of the flange 57 is a stub shaft 59 terminating in a square or otherwise non-circular portion 60 adapted to project into a correspondingly shaped recess in the shaft of an electrical rotating device in an adjacent test unit.

The apertures 58, the pins 54 of the shafts 55 and 59 are so located that the unit is substantially in balance when rotating about the shafts 55 and 59.

The coupling member 50 is substantially free floating and in order to reduce noise, each of the apertures 58 is lined with a plastic bushing 61 such as neoprene, Teflon or the like. The pins 54 may be steel or other metal welded to the flange 51 and they, likewise, may be coated with plastic such as neoprene or Teflon to again reduce noise. The noise is also further reduced by providing resilient washers 62 and 63 at the juncture of the stub shafts and the respective non-circular portions. These may be rubber, plastic, or any other relatively deformable material. Noise is further reduced by preventing the flanges 51 and 52 from coming into contact with one another by means of a plastic pin 64 secured to one flange and projecting therefrom in a direction towards the other flange. This pin is located on the axis of rotation of the coupling member. This plastic pin also provides means whereby the flanges may run at a slight angle with respect to one another without being in contact and such non-alignment is also facilitated by virtue of having the apertures 58 of somewhat greater diameter than the pins 54.

Figure 9:
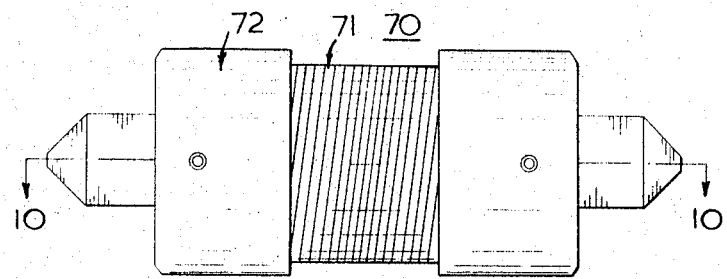
FIG. 9 illustrates a modified coupling.
Figure 10:
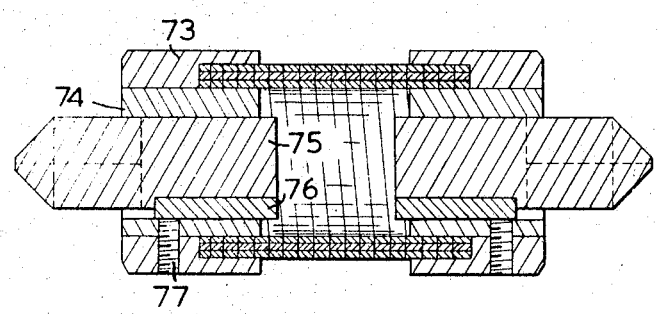
FIG. 10 is a cross-section along section 10—10 of FIG. 9.

A still further form of drive coupling is illustrated in FIGS. 9 and 10. Shown therein is a drive coupling 70 consisting of a flexible center portion 71 having a cap 72 secured to opposed ends thereof. Each of the caps 72 includes an outer sleeve 73 and an inner sleeve 74 with a portion of one of the adjacent surfaces of one of the sleeves recessed to receive the end of the flexible member 71 and clampingly engaging such end therebetween and, thus, secure the cap to the flexible member. The sleeve 74 includes a central aperture and receives a stub shaft 75. The portion of the shaft 75 inserted into the sleeve is generally circular in cross-section and is retained in position by a woodroff key 76 and an Allen screw 77. The stub shaft 75 has a portion which projects outwardly beyond the cap and such projection is non-circular in cross-section and is adapted to be inserted into suitable recesses in the shaft of the rotor of an electric rotating device.

In joining together a pair of test units, the elements of the interconnecting member 25 are brought into engagement and thereafter the frames of the test units are pivoted thereabout bringing frame members 17 and 18 substantially into abutting relationship. FIG. 7 illustrates the first stage wherein the leg 29A of the interconnecting member 25 is inserted into the groove 27A of the element 27. In this position, the drive coupling has one end inserted into the cavity 43 of the bell housing on the rotor shaft of test unit 10A and the other end projects into the cavity 43 of the bell housing on the other test unit.

The test units 10 and 10A are thereafter pivoted about a vertical pivot axis provided by engagement of elements 27 and 29 of the interconnecting member 25 until the elements 31 and 32 are in locking engagement. During this pivotal movement, the flexible shaft is guided into position by the sloped walls of the bell housing cavity 43 such that the end of the shaft enters into the non-circular cavity and, thus, joins the rotors such as to rotate in unison.

Figures 12, 13:
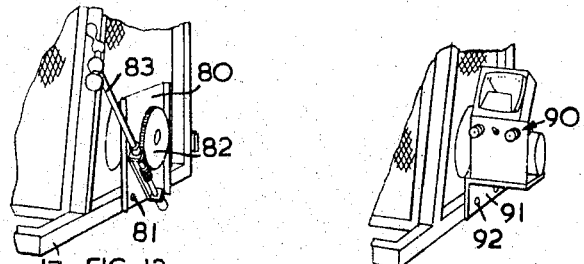
FIGS. 12 and 13 are oblique, partially in section, elevational views illustrating means of detachably securing accessories to the test units for conducting specific tests on the electrical rotating devices associated therewith.
Figure 14:
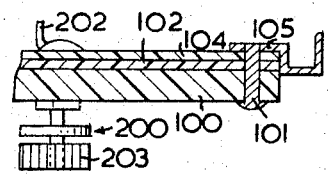
FIG. 14 is a partial sectional view taken along section 8—8 of FIG. 1 illustrating the construction of the insulating panels on the front face of the housing of the test units and diagrammatically illustrates a terminal secured thereto in a representative manner; and, FIG. 15 is a cross-sectional view of a modified coupling generally of the type illustrated in FIGS. 5 to 8.

Shown in FIGS. 12 and 14 are attachments detachably secured to the rail 17 of the carriage base by means of bolts, screw or the like. Shown in FIG. 12 is a plate 80 secured to rail 17 by means of a pair of bolts 81 and secured to such plate is a worm and pinion assembly 82. A crank 83 permits manual rotation of the rotating electrical device at an extremely slow speed.

Shown in FIG. 13 is a tachometer 90 mounted upon an L-shaped bracket 91 which may be detachably secured to the rail 17 by means of bolts 92 or any other pin and aperture arrangement.

As previously mentioned briefly, the housing 13 which encloses the circuitry has a front face upon which the terminals for the circuit are connected.

In FIG. 14 there is shown a small portion in cross-sectional view of the casing front face which consists of a clear plastic plate 100 secured to a metal casing which together define the housing. The plate 100 is secured by means of bolts 101 and for appearance purposes, the rear surface of the plastic sheet 100 is covered with a decorative coating 102 or the like by a silk screen process and protected by an overlying film 104. The film 104 may be clear or pigmented plastic paint or the like, brushed or rolled on, or other wise applied. In order to prevent students or other persons from attempting to remove the coatings on the edges, the walls of the casing adjacent the front edge are turned rearwardly to provide a flange 105 disposed rearwardly of the front face of the casing. From FIG. 14 it will be clearly seen that such recessing completely protects and prevents access to the coatings applied at the rear surface of the plastic.

Also shown in FIG. 14 is a terminal 200 consisting of a conductive bolt and nut assembly. The bolt includes a tab portion 202 to facilitate connecting thereto the electrical wiring as by soldering, or the like. An enlarged insulated nut 203 is provided to facilitate connecting wires to the terminal by the student for test purposes and also provides protection for the conductive terminal exposed portions.

The structure just described is a safe open terminal board for electrical circuitry which is relatively cheap to manufacture and yet pleasing in appearance.

I claim:

1. Portable laboratory electrical test apparatus comprising:
   (a) first and second portable electrical test units each including a rotating electrical device secured to a base mounted for rolling along a floor with the rotors of the rotating electrical device of the respective test units disposed in similar positions; and,
   (b) a pair of interconnecting members, each said pair having at least one element on each of said first and second test units, the elements on one unit being located at an edge thereof adjacent the other test unit and cooperating therewith detachably to interconnect said test units side-by-side, said pair of interconnecting members being disposed in spaced relation with respect to one another, along said test unit edge.

2. Electrical portable test apparatus as defined in claim 1 wherein one of said interconnecting members includes a pair of elements pivotable with respect to one another about a vertical axis whereby such interconnecting member may be first joined and the test units thereafter pivoted thereabout to bring into engagement the elements of the other interconnecting member to interconnect said test units.

3. Electrical portable test apparatus comprising:
   (a) first and second portable electrical test units each including a rotating electrical device secured to a base mounted for rolling along a floor, each electrical device having a rotor and the rotor of the respective test units being disposed in similar positions with the axis thereof normal to a first edge of the base of the respective test units; and,
   (b) a pair of interconnecting members, each said pair having at least one element on each of said first and second test units, the elements on one test unit being located at an edge thereof adjacent the other test unit and cooperating with said elements thereon to interconnect said test units side-by-side with the respective adjacent edges of said first and second test units substantially in abutting relationship, said pair of interconnecting members being disposed in spaced relation, with respect to one another, along said adjacent edge and the elements of one of said interconnecting members being selectively pivotable with respect to one another about a vertical axis.

4. Electrical test apparatus as defined in claim 3 wherein said pivotable interconnecting member consists of an element secured to one base and projecting therefrom in a direction toward the other base and means on said element engaging said other base and thereby interconnecting the adjacent edges of the respective bases of the test units.

5. Electrical test apparatus as defined in claim 3 wherein said pivotable interconnecting member consists of an element projecting from one base toward the other base at a position adjacent an edge of the bases located normal to said first edge, said element having a groove therein and a further element on said other base having at least a portion thereof projecting into said groove and thereby pivotally interconnecting the adjacent edges of the respective bases of the test units at a position toward one end of said adjacent edges.

6. Electrical test apparatus as defined in claim 3 wherein said pivotable interconnecting member consists of an element having a groove disposed adjacent an end of the first edge of one base and a further element similarly positioned on the other base, at least one of said element or further element projecting from their respective base toward the other base whereby said element and further element overlap and at least a portion of said further element projecting into said groove in nesting relation and thereby pivotally interconnecting the bases of said test units at a position toward one end of said adjacent edges.

7. Portable laboratory electrical test apparatus comprising:
   (a) first and second portable electrical test units each including a portable carriage having an electrical device mounted thereon, each said electrical device having a stator and a rotor;
   (b) a pair of interconnecting members each having cooperating parts disposed on respective ones of the carriages detachably to interconnect said carriages in side-by-side relation with the rotors of the respective electrical devices substantially in alignment end-to-end in selected spaced relation; and,
   (c) a drive coupling detachably secured to adjacent ends of the rotor of the respective units, said drive coupling interconnecting said rotors whereby they are adapted to rotate in unison in a drive and driven relationship.

8. The test apparatus as defined in claim 7 wherein the test unit carriages are coupled together simultaneously with securement of the drive coupling to said rotors.

9. Portable test apparatus as defined in claim 7 wherein said pair of interconnecting members are disposed in spaced relation along the adjacent edges of the carriages joined together side-by-side.

10. A carriage for portable electrical test apparatus used in a laboratory comprising:
    (a) a base mounted to roll upon the surface of a floor;
    (b) a skelton framework secured to said base and projecting upwardly therefrom adjacent opposed marginal edges thereof, and,
    (c) means for interconnecting a pair of said carriages side-by-side comprising:
        (i) a pair of elements secured to said base, adjacent one of said marginal edges, in spaced relation therealong, and,
        (ii) a pair of elements similarly disposed adjacent the opposed marginal edge of said base, said elements on the opposed marginal edges cooperating to form first and second interconnecting members adjacent opposed ends of the marginal edges of a pair of carriages interconnected side-by-side.

11. A carriage as defined in claim 10 wherein the elements on one edge consist of a pair of spaced lugs projecting from said base, one of said lugs having an aperture and the other a groove with the axis of each disposed vertically, the respective elements on the opposed marginal edge consisting of a pin movable along a vertical axis and an L shaped lug having a projecting leg portion, the pin of one carriage fitting into the aperture of an adjacent carriage and the leg of the other fitting into said groove to provide respective second and first interconnecting members detachably to interconnect an adjacent pair of carriages.

12. A carriage for portable test units used in a laboratory wherein a pair of such carriages may be interconnected side-by-side comprising:
   (a) a base,
   (b) a plurality of casters secured to said base and disposed to be in rolling engagement upon a suitable foundation,
   (c) a skelton frame projecting upwardly from said base, said skelton including:
      (i) a pair of members directed upwardly from said base adjacent a pair of opposed marginal edges thereof, and,
   (d) means associated with said carriage whereby it may be detachably interconnected to an adjacent carriage along one of said pair of marginal edges.

13. A carriage as defined in claim 12 wherein said means consists of a pair of spaced interconnecting members located along said marginal edge.

14. A carriage as defined in claim 12 wherein said means consists of a pair of interconnecting members spaced along said marginal edge and disposed respectively adjacent the rear and front o fsaid base, the interconnecting members adjacent the rear of said base comprising a pair of cooperating elements providing pivotal movement of the bases of an adjacent pair of carriages and said front interconnecting member consisting of a pin resiliently biased to engage an apertured striker plate associated with the base of the adjacent carriage.

15. A carriage as defined in claim 12 wherein said base and frame is a weldment of hollow members providing a base with substantially only a peripheral member and the frame consists of a pair of bars extending upwardly from a pair of opposed marginal edges of the base and interconnected adjacent their upper edge.

16. A carriage as defined in claim 15 including a casing disposed between said pairs of bars at the opposed marginal edge of the base suspended from said frame.

17. A carriage as defined in claim 12 including an electrical device mounted upon said base and a screen secured to the frame and substantially surrounding said electrical device.

18. A portable test unit for use in a laboratory having an electrical device mounted thereon and electrical circuitry associated therewith, said test unit comprising a carriage having a base and a skelton frame work projecting upwardly therefrom, said skelton frame work comprising at least a pair of spaced members secured to opposed marginal edges of said base and interconnected adjacent their upper edges, a casing enclosing said electrical circuitry suspended from said frame and an electrical device mounted upon said base and connected to said circuitry, a screen secured to said frame work and substantially surrounding said electrical device and interconnecting means associated with the base of said carriage whereby one such portable test unit may be detachably secured to a similar unit in side-by-side relationship, said interconnecting means including a first interconnecting member consisting of a bar and catch elements located on respective ones of said test units adjacent one edge of the base and cooperating to permit pivotal movement of one unit with respect to the other about such interconnecting member and a second member spaced from said first interconnecting member and comprising a pin on one unit and an apertured striker plate on the other unit adapted to lock upon abutment of one test unit against the other test unit.

19. A casing enclosing an electrical circuitry and providing a mounting for meters associated therewith, said casing comprising at least a pair of opposed side walls and a front wall, said front wall having at least a portion thereof of insulated material with conducting terminals connected to the electrical circuitry and secured to and projecting through such insulated material, said insulated wall being substantially transparent and having a decorative material secured to the rear face thereof.

20. A casing as defined in claim 19 wherein said side walls include a flange spaced rearwardly of the front marginal edge and projecting inwardly toward one another providing means for securing the side walls to the front wall and to protect the marginal edge of the front wall.

21. Portable laboratory electrical test apparatus comprising:
   (a) first and second portable electrical test units each including an electrical device mounted thereon having a rotor,
   (b) means detachably to interconnect said first and second test units side-by-side with the rotor shafts of the rotating devices in alignment end-to-end and disposed in spaced relation, and,
   (c) flexible drive coupling means detachably secured to adjacent ends of said shafts interconnecting the same to rotate in unison.

22. Electrical test apparatus as defined in claim 21 including guide means for connecting said drive coupling to the shafts simultaneously with joining together said test units.

23. Portable laboratory electrical test apparatus comprising:
   (a) first and second portable electrical test units each including a carriage and an electrical device mounted thereon;
   (b) means detachably interconnecting the carriages of said first and second test units side-by-side with the rotor shafts of the rotating devices in alignment end-to-end and disposed in spaced relationship; and,
   (c) flexible drive coupling means disposed between said shafts and detachably securable thereto interconnecting the same whereby the rotors of the adjacent test units are interconnected to rotate in unison, said flexible drive coupling comprising a flexible shaft having non-circular in cross-section end portions inserted into similarly shaped recesses in the ends of the rotor shafts of the adjacent rotating devices.

24. An electrical test apparatus as defined in claim 23 including guide means comprising a bell housing on at least one of the shafts to provide means of directing the end of the coupling into the recess in the shaft.

25. Portable electrical test apparatus as defined in claim 1, including means to lock the adjacent test units in said interconnected side-by-side relationship.

26. Portable electrical test apparatus as defined in claim 1, wherein said interconnecting means lock the adjacent test units in said interconnected side-by-side relationship.

27. Portable electrical test apparatus as defined in claim 7, including means to lock said adjacent test units together in said interconnected side-by-side relationship.

28. Portable electrical test apparatus as defined in claim 7, wherein said interconnecting members lock the adjacent test units together in said interconnected side-by-side relationship.

29. A carriage for portable electrical test units used in a laboratory comprising:
   (a) a base mounted to roll upon the surface of a floor;
   (b) a framework secured to said base and projecting upwardly therefrom to provide a support for components associated with the test apparatus; and,
   (c) means for interconnecting a pair of said carriages side-by-side comprising:
      (i) a pair of elements secured to said base adjacent one of the marginal edges thereof and in spaced relation therealong with respect to one another; and, (ii) a pair of elements similarly disposed adjacent a marginal edge of said base, which marginal edge is located on the opposite side of the base to that of the first mentioned marginal edge, said elements on the opposed marginal edges, cooperating to form first and second interconnecting members adjacent opposed ends of the marginal edges of a pair of such carriages interconnected side-by-side.

30. A carriage as defined in claim 10 wherein the elements of each first and second interconnecting member consists of a lug projecting from the base of one carriage toward the base of the other and a member in said other base engaging a portion of said lug.

31. A carriage for portable test units used in a laboratory wherein a pair of such carriages may be interconnected side-by-side comprising: a base having a plurality of casters secured thereto and disposed to be in rolling engagement upon a suitable foundation and a frame for supporting components of electrical apparatus associated with said test units, and means associated with said carriage whereby such carriage may be detachably interconnected with an adjacent similar carriage along one marginal edge thereof, said means comprising a pair of interconnecting members located in spaced relation parallel to said marginal edge and each having an element adjacent said marginal edge and a further element adjacent a further marginal edge parallel to said marginal edge, the elements adjacent the opposed marginal edges cooperating to provide first and second interconnecting members on a pair of carriages assembled side-by-side.

References Cited

UNITED STATES PATENTS

| 520,788 | 6/1894 | Knowles | 318—5 X |
| 2,518,506 | 8/1950 | Thompson | 35—19 |
| 2,783,402 | 2/1957 | Luenberger | 310—112 |

EUGENE R. CAPOZIO, *Primary Examiner.*

H. S. SKOGQUIST, *Assistant Examiner.*